Figure 1:
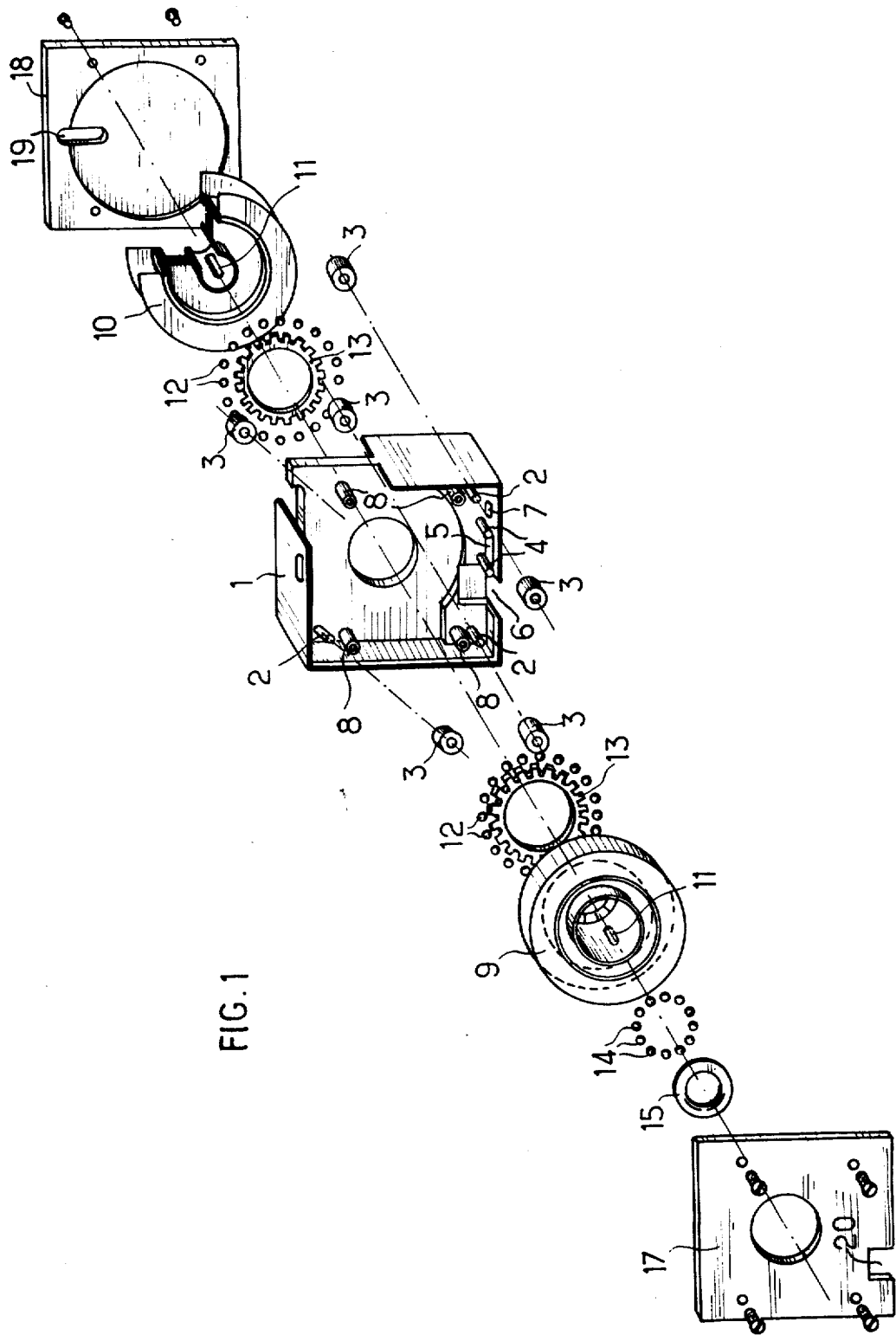

United States Patent [19]
Laine

[11] 3,888,431
[45] June 10, 1975

[54] REMOVABLE INTERCHANGEABLE HOLDER DEVICE FOR A RECORDER TAPE

[76] Inventor: Michel Laine, 20 Rue Odilon Roson 91, Bievres, France

[22] Filed: July 7, 1972

[21] Appl. No.: 269,616

[30] Foreign Application Priority Data
July 7, 1971 France ............................ 71.24791
June 14, 1972 France ............................ 72.21525

[52] U.S. Cl. ............................ 242/194; 242/188
[51] Int. Cl. ............................ G11b 23/10
[58] Field of Search ......... 242/194, 193, 54.1, 68.3, 242/56.9, 188; 274/4 C; 352/78, 72, 159

[56] References Cited
UNITED STATES PATENTS

| | | | |
|---|---|---|---|
| 2,668,021 | 2/1954 | Gleason | 242/54.1 |
| 3,083,925 | 4/1963 | Schoebel | 242/194 |
| 3,363,852 | 1/1968 | Maxey | 242/193 |

FOREIGN PATENTS OR APPLICATIONS

| | | | |
|---|---|---|---|
| 912,870 | 6/1954 | Germany | 242/193 |
| 70,496 | 5/1946 | Norway | 242/54.1 |

Primary Examiner—George F. Mautz

[57] ABSTRACT

A removable interchangeable holder device for a recorder tape, in which the two spools for taking up and taking off the tape are placed one behind the other on the same axle, and are holed through the centre to allow the passage of at least one recorder pin equipped with coupling claws. This holder device is remarkably compact adapted to fit precisely on to measuring instruments such as digital recorders with multi-track magnetic tapes.

6 Claims, 3 Drawing Figures

REMOVABLE INTERCHANGEABLE HOLDER DEVICE FOR A RECORDER TAPE

The invention relates to a device generally known as a "cassette", by means of which a recording tape can easily be stored and fitted or removed at will from a recording or reproducing instrument, conveniently, quickly and without risk of damage to the tape.

Magnetic tape-holders are already known, notably for tape recorders, which contain two spools, one take-up and one take-off, while a window in the side of the holder allows the component reading or controlling the tape to be operated and pins with coupling claws can engage with the spools through the sides of the holder.

But in the latter, the two spools are on two parallel axles, some distance from each other to enable the tape to move between the two spools. In this case, there is necessarily fairly considerable space wastage. Moreover, there is some play of the spools on their spindles and it is impossible to prevent the tape from rubbing against the sides of the holder. This may be all right for musical equipment where the tape moves comparatively slowly, but not for industrial uses requiring the tape to turn at high speed.

The invention remedies these disadvantages and it provides a compact holder device which fits precisely on to measuring instruments such as digital recorders with multi-truck magnetic tapes.

In a device with a removable and interchangeable holder containing a spooled memory tape, which moves in order to be printed or read by a recording or reading instrument, whose rotating pins drive the tape through the sides of this holder which is associated with the instrument, in accordance with the invention two spools for taking up and taking off the tape are placed one behind the other on the same axle, and they are holed through the centre to allow the passage of at least one recorder pin equipped with coupling claws.

This form of embodiment is applied to a magnetic tape, the holder comprising two windows at the base, one for a pressure roller, the other facing a magnetic head, the holder moreover allowing the passage of a coupling pin and containing a cushion for applying the tape opposite the magnetic head. To receive the holder, the recorder forms a console the shelf of which carries the base of the holder, while projecting from the vertical face of the recorder there are two coaxial shafts with, at different levels, spool holders with claws on which each of the two spools is slotted.

Figure 2:
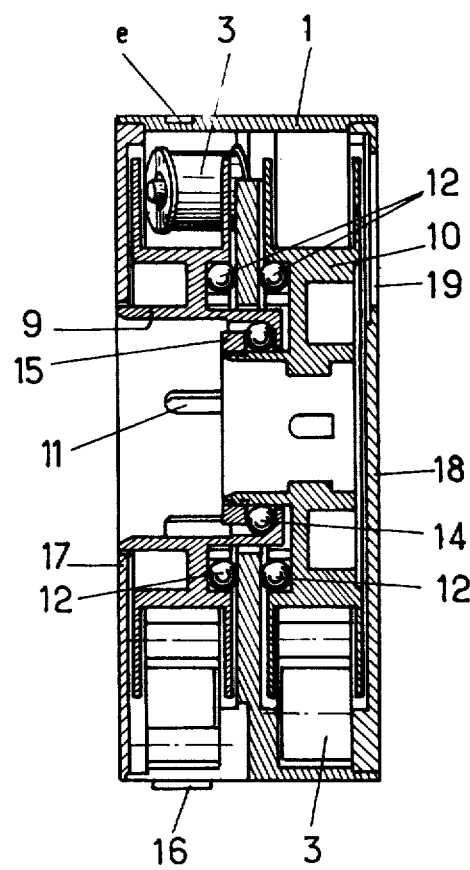
Figure 3:
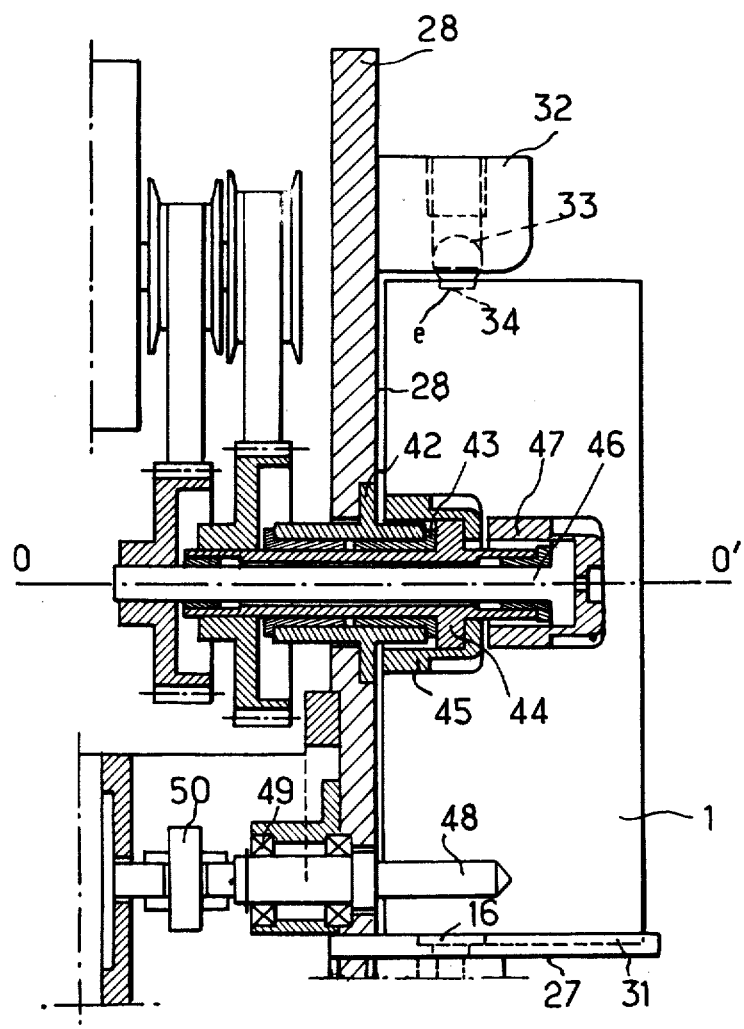

A better understanding of the invention will be obtained from the following description, given as an example, with, in the attached drawings:

FIG. 1 showing an exploded perspective view of the cassette;

FIG. 2 showing a section of the cassette;

FIG. 3 showing a side view of the reader-recorder with partial section.

The cassette consists of a moulded holder 1 forming two compartments separated by a central partition (FIGS. 1 and 2). This central partition carries on each side: three axles 2 to support rollers 3 defining the movement of the recording tape; two studs 4 which serve as supports for the tape when the recording or reproducing head is introduced through an opening 5 in the cassette; another opening 6 provides a passage for a driving capstan and a pressure roller belonging to the recording and reproducing instruments; in each compartment, an aperture 7 makes it possible to detect the end of the recording tape fitted with a reflecting marker; four small columns 8 serve to fix the lid.

The bottom part of the cassette comprises two studs 16 which can be seen in FIG. 2, and the top part a notch (e) (FIGS. 1 and 2) making it possible to position the cassette precisely on the recording or reproducing instruments.

A spool with a large hub 9 and a spool with a small hub 10 are fitted in their central bores with four driving fingers 11. These spools are pressed on either side of the central partition via balls 12 and two spacer rings 13.

FIG. 2 shows the assembly of the components shown in FIG. 1, by means of another set of balls 14, held fairly tightly by a nut 15, so as to provide smooth working without play. Such a mounting provides excellent coaxiality of the two spools, the common axle being orthogonal to the central partition of the cassette. The result is that when the cassette is placed on to a recording or reproducing instrument, and precisely positioned by means of the notch (e) and the two bosses 16, the common axle of the spools is identical with the axle of the driving hubs of the instrument.

The back of the cassette is closed with a lid 17 in which a circular opening allows the passage of the axles driving the spools, and in which a bottom notch 20 gives passage to the capstan of the instruments. The forward compartment is closed with a lid 18 comprising an elongated opening 19 enabling the user to see the tape wound on the spool 10.

Referring to FIGS. 1 and 2, we see that the tape which unwinds from one spool winds on to the other spool positioned in the neighbouring compartment, passing into the zone of use near the base of the holder, then coming up again towards the top part where it goes from one compartment to the other, passing through the central part of the holder, then comes downwards again in the second compartment.

The holder 1 is designed to be associated with an instrument with at least one of the two functions of recording and reading. The method of assembly with this instrument is shown in FIG. 3.

The magnetic reader-recorder, which is not part of the invention, is not described in detail and only the components which enable it to be coupled with the tape-holder 1 will be mentioned below. Said reader-recorder includes a shelf 27, horizontal in the figure, and a vertical facade 28 to receive the holder 1. The guiding studs 16 of the holder slide in the grooves 31 in the reader-recorder while the notch e in the holder 1 fits into 34, under a shoulder 32 of the reader-recorder which projects from the face 28, by means of a ball lock 33 of an ordinary type.

Under the shelf 27 are components, not shown, of the reader-recorder, pressure roller and reading and recording head, with a lever making it possible to raise them to make contact with the magnetic tape, respectively through the windows 5 and 6 shown in FIG. 1. This lever, in accordance with a well-known safety device, can only be operated when the holder is correctly positioned on the console of the reader-recorder. During the positioning manoeuvre, the driving shafts along the axis OO' penetrate into the holder. The driving mechanism for the spools is along the axis OO' of the holder. A pillow-block 42 carries, with bearings 43 interposed, a hollow shaft 44 which is fixed to a first spool-holder with claws 45, connecting with the bore of the spool 9. The hollow shaft 44 is traversed by a solid shaft 46 which is longer on either side and which carries, at the end projecting from the spool-holder 45, another spool-holder 47 connecting with the bore of the spool 10. On the recorder side, the two shafts are connected to pulleys driven by motors in the usual way. Near the base of the holder, the surface facing towards the recorder is traversed by a third manoeuvring shaft 48 termed a "capstan" whose rotary movement acts directly on the tape in the neighbourhood of the magnetic head. In effect, the two concentric shafts are responsible for rapid winding or unwinding, while the capstan shaft is responsible for the precise movements of the tape for digital control sequences. The shaft 48 goes through the facade 28 and is carried at the back on a ball bearing 49, a coupling 50 connecting it at the back to a step-by-step or similar motor.

Under the conditions of the present invention, the positioning of the cassette on the instruments becomes very precise, as well as the guiding of the tape in the cassette, so that the interchangeability between instruments and cassettes is perfectly ensured with correct working both for longitudinal and transversal coding.

It goes without saying that various variations of detail can be made without departing from the spirit of the invention, the foregoing description only being given as an example. In particular, the holder can be inserted into the recorder like a drawer, while the shafts would be translatory and would be inserted into the spools after the holder had been put into position. The shafts could have a common axle, but face each other gripping the holder, each in a spool compartment. The positioning of the control and reading windows is not necessarily on the same side of the holder, etc., and all these modifications remain within the scope of the main lines of the invention.

I claim:

1. A tape cassette for magnetic recording tape comprising: a front surface, a rear surface and a central partition parallel to said surfaces, forming in said cassette a front and a rear compartment; a front and a rear cover; means closing said compartments; a spool in each of said compartments, the two spools having coaxial hubs having cylindrical parts and two faces each, one face on the inside next to said central partition, and the other face on the outside next to one of said covers, the rear cover and the central partition having openings on the same axis as the spool hubs; at least one straight roller and an oblique roller in each of said compartments, the two oblique rollers having parallel axes; magnetic tape running from a first spool to the straight roller, then to the oblique roller of a compartment, and passing through the central partition and over the second oblique roller, then over the second straight roller and winding onto the second spool; a first plane ball bearing between the central partition and the inner surface of the front spool; a second plane ball bearing between the central partition and the inner surface of the rear spool; a third ball bearing between the inner cylindrical surface of the hub of the rear spool and the outer cylindrical surface of the hub of the front spool; means for clamping the hub of one of the spools on the hub of the other spool, to avoid play of said bearings by regulating pressure on the balls of the bearings between said central partition and said front faces; and means guiding, positioning and locking the cassette on a magnetic recording and pick-up instrument designed to use said cassette, at least one spindle of said instrument passing through the opening of the cover into one of said hubs and causing it to rotate.

2. A cassette according to claim 1, in which said hubs of the spools are rotatable, said magnetic instrument having two coaxial spindles, each of which engage with one of the hubs.

3. A cassette according to claim 1, in which at least one of said compartments has a second straight roller, and windows opening onto the tape between the straight rollers.

4. A cassette according to claim 1 in which the front cover has a window showing the degree of winding of the front spool.

5. Device in accordance with claim 3, characterised in that the instrument has two guide grooves into which studs on the base of the cassette slot and the latter comprises sockets into which push-dowels lock when the cassette has windows in the correct position in relation to the components of the instrument.

6. Device in accordance with claim 5, characterised in that the base of the holder has two windows pierced in it opposite the movement of the tape through the two compartments, reflecting markers traced on the tape near its ends making it possible, in cooperation with photo-electric means, to stop the tape automatically.

* * * * *